(12) United States Patent
Chen et al.

(10) Patent No.: US 6,848,186 B1
(45) Date of Patent: Feb. 1, 2005

(54) SAW BLADE CLAMPING DEVICE

(75) Inventors: Ruey-Zon Chen, Taichung Hsien (TW); Eric Lo, Taichung Hsien (TW); George Ku, Taichung Hsien (TW)

(73) Assignee: Rexon Industrial Corp., Ltd., Taichung Hsien (TW)

( * ) Notice: Subject to any disclaimer, the term of this patent is extended or adjusted under 35 U.S.C. 154(b) by 0 days.

(21) Appl. No.: 10/642,295

(22) Filed: Aug. 18, 2003

(51) Int. Cl.[7] .................................................. B27B 3/12
(52) U.S. Cl. ............................ 30/392; 30/335; 279/76; 83/699.21
(58) Field of Search ......................... 30/392, 335, 393, 30/394, 397, 165, 166.3, 329; 83/698.11, 698.71, 699.21; 279/75, 77, 76, 81, 87

(56) References Cited

U.S. PATENT DOCUMENTS

| | | | | |
|---|---|---|---|---|
| 44,823 A | * | 10/1864 | Rose | 279/81 |
| 1,070,523 A | * | 8/1913 | Pecord | 279/77 |
| 1,312,298 A | * | 8/1919 | Bileck | 279/77 |
| 1,998,188 A | * | 4/1935 | Dunn | 279/77 |
| 4,592,144 A | * | 6/1986 | Tolbert et al. | 30/394 |
| 4,601,477 A | * | 7/1986 | Barrett et al. | 279/30 |
| 5,443,276 A | * | 8/1995 | Nasser et al. | 279/77 |
| 5,479,709 A | * | 1/1996 | Lai | 30/123.3 |
| 5,722,309 A | * | 3/1998 | Seyerle | 83/699.21 |
| 6,009,627 A | * | 1/2000 | Dassoulas et al. | 30/392 |
| 6,484,409 B2 | * | 11/2002 | Campbell et al. | 30/371 |
| 2003/0106407 A1 | * | 6/2003 | Wuensch et al. | 83/699.21 |
| 2003/0121387 A1 | * | 7/2003 | Wheeler et al. | 83/698.71 |

* cited by examiner

*Primary Examiner*—Allan N. Shoap
*Assistant Examiner*—Ghassem Alie
(74) *Attorney, Agent, or Firm*—Bacon & Thomas PLLC

(57) ABSTRACT

A blade clamping device includes a driving shaft and a base member fixedly mounted to the driving shaft. An opening is defined in the base member and a blade is inserted in the base member and connected to the driving shaft. A cam member is pivotably engaged with the opening of the base member and a cam head contacts a side of the blade. The base member is received in a casing which is connected to the electric saw and an opening is defined in the casing. A lever is pivotably engaged with the opening of the casing and includes a pushing end which is located beneath a bar of the cam member so that when pivoting the lever, the pushing end pivots the cam member to remove the cam head from the blade.

5 Claims, 8 Drawing Sheets

US 6,848,186 B1

SAW BLADE CLAMPING DEVICE

FIELD OF THE INVENTION

The present invention relates to a saw blade clamping device for an electric saw. The saw blade can be easily and quickly fastened or loosened by pulling a lever on the outside of the barrel of the electric saw.

BACKGROUND OF THE INVENTION

A conventional saw blade clamping device 10 is disclosed in U.S. Pat. No. 5,647,133 and FIGS. 1 and 2, wherein the clamping device includes a body 11 having a slot 111 for receiving a blade 20 therein and a passage 112 defined in communication with the slot 111. A tube 14 has a rod 13 received therein and the rod 13 includes a rectangular end 131 which fits an inner periphery of the tube 14. A spring 15 is mounted to the rod 13 and biased between the rectangular end 131 and the inside of the tube 14. The rod 13 threadedly extends through the body 11 and further has a contact end 12 which is able to contact a side of the blade 20. The body 11 includes a serrated surface 113 and the tube 14 is firmly urged by the spring 15 to contact the serrated surface 113. A user has to pull the tube 14 to remove the tube 14 away from the serrated surface 113 and then rotate the tube 14 so as to move the rod 13 to urge the blade 20 or disengage from the blade 20. The user has to use a force that overcomes the force of the spring 15 and simultaneously, rotate the tube 14. This is inconvenient for the user to operate the tube 14 in two different directions. Furthermore, it is difficult to estimate the force that the contact end 12 contacts the blade 20.

FIGS. 3 and 4 show the disclosure of U.S. Pat. No. 6,023,848 illustrating a blade clamping device 30 including a casing 31 and a base member 32 located in the casing 31. A first end of a biasing member 33 is connected to the base member 32. A blade 40 is engaged with the base member 32 and the biasing member 33 includes a protrusion portion 331 which urges against the blade 40. A lever 34 is pivotally connected to the casing 31 and includes an end that may push a free second end of the biasing member 33 to remove the protrusion portion 331 away from the blade 40. Although the biasing member 33 is easy to operate by operating the lever 34, the biasing member 33 quickly looses its biasing force after frequent operation by the lever 34.

SUMMARY OF THE INVENTION

In accordance with one aspect of the present invention, there is provided a blade clamping device for an electric saw which comprises a driving shaft having an extension extending from a distal end thereof and the driving shaft is inserted in a passage in a base member. A blade is connected to the driving shaft. An opening is defined through a side of the base member and communicates with the passage. A cam member is pivotably engaged with the opening in the base member and a cam member of the cam member removably contacts the blade. A second end of the cam member is a bar. A first torsion spring is connected to the base member to maintain the cam head to contact the blade.

A casing is mounted to the base member and has an opening with which a lever is pivotably engaged. The lever includes a handle and a pushing end which is located beneath the bar of the cam member. The cam head of the cam member is pivoted away from the blade by the pushing end by pivoting the lever.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
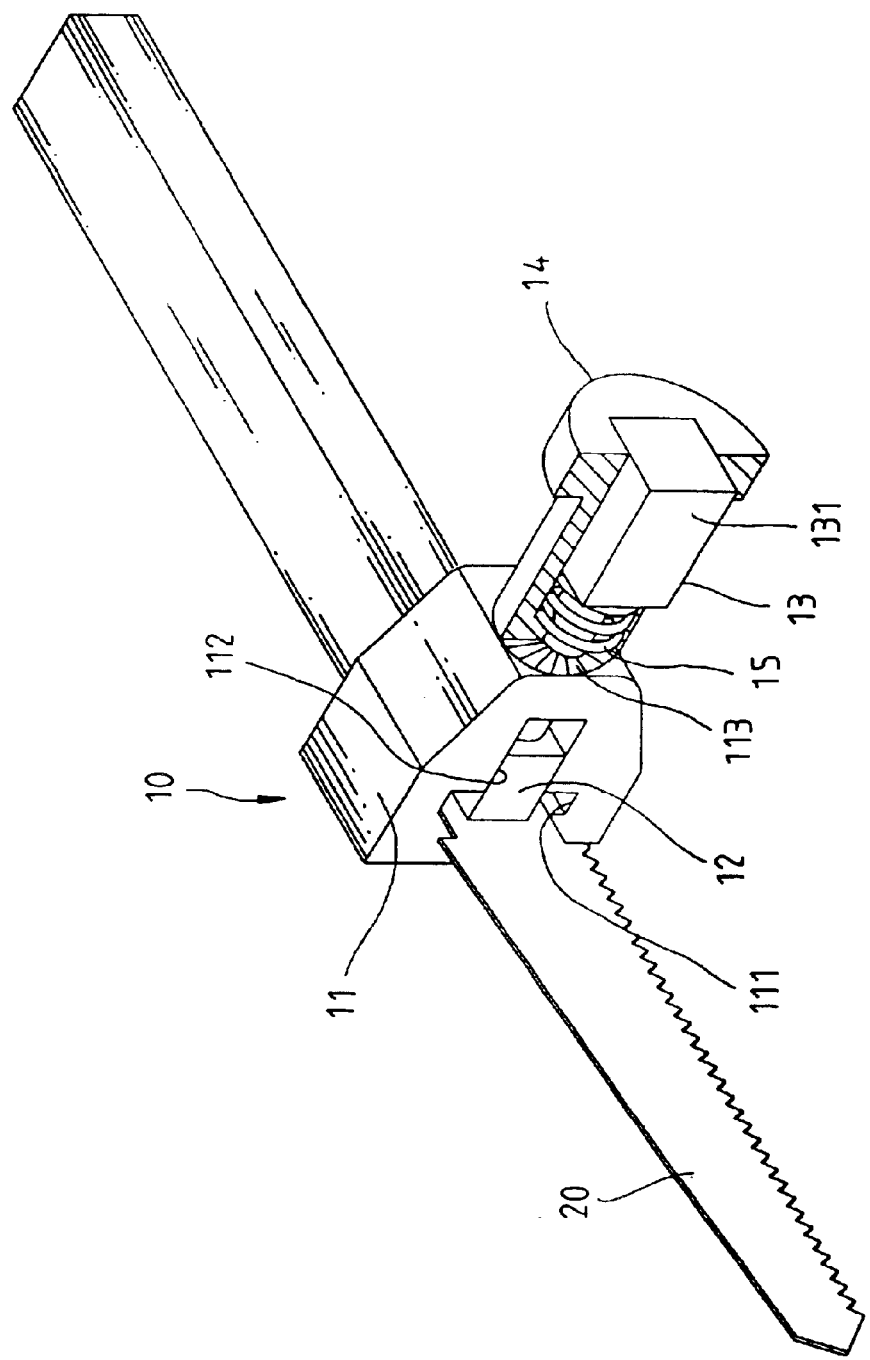
FIG. 1 is a perspective view to show a first conventional blade clamping device.
Figure 2:
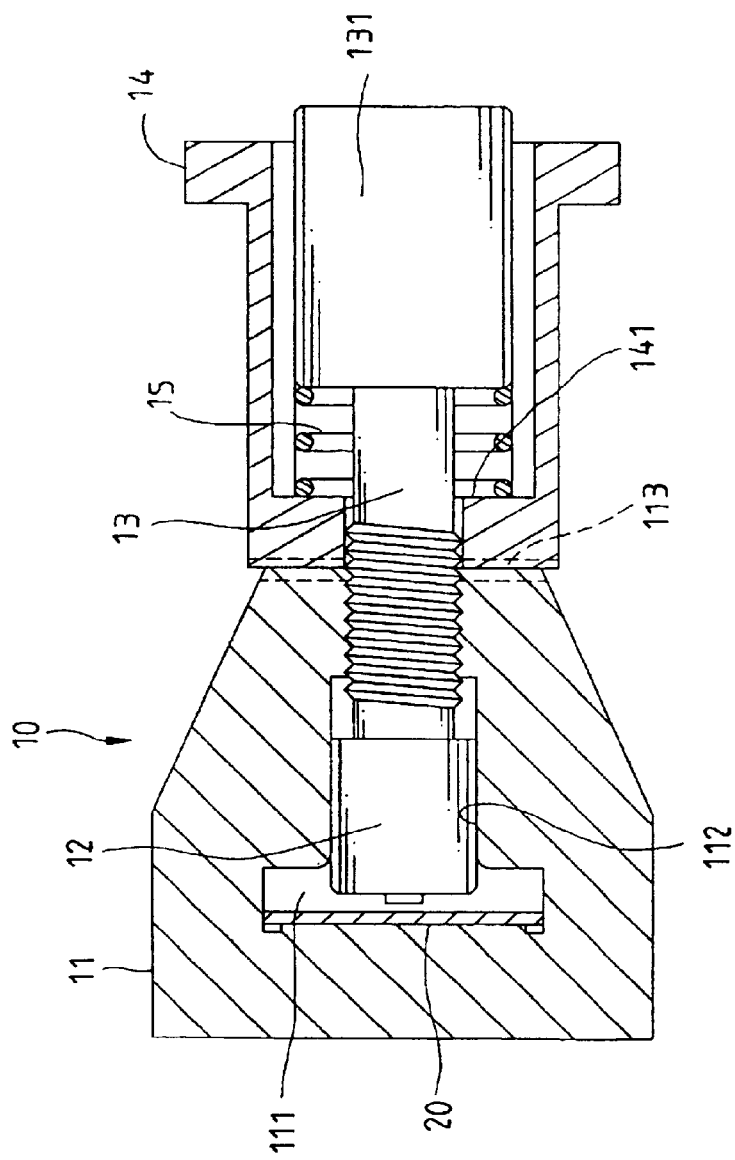
FIG. 2 is a cross sectional view to show the first conventional blade clamping device.
Figure 4:
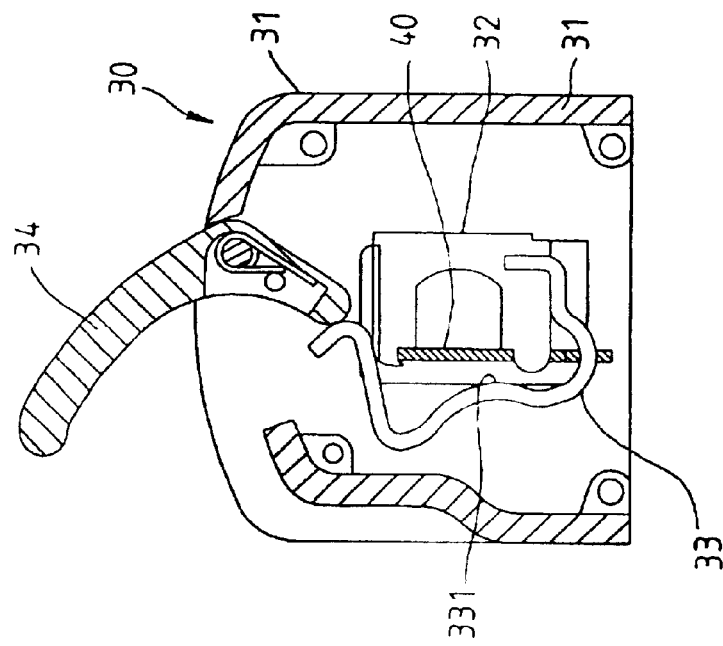
FIG. 4 shows that the biasing member is pushed by the lever to release the clamp of the blade of the second conventional blade clamping device.
Figure 3:
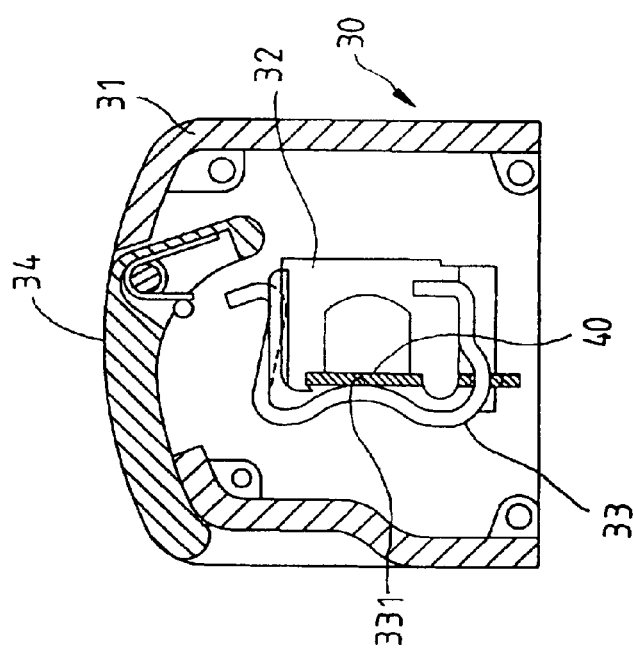
FIG. 3 shows a cross sectional view of a second conventional blade clamping device.
Figure 5:
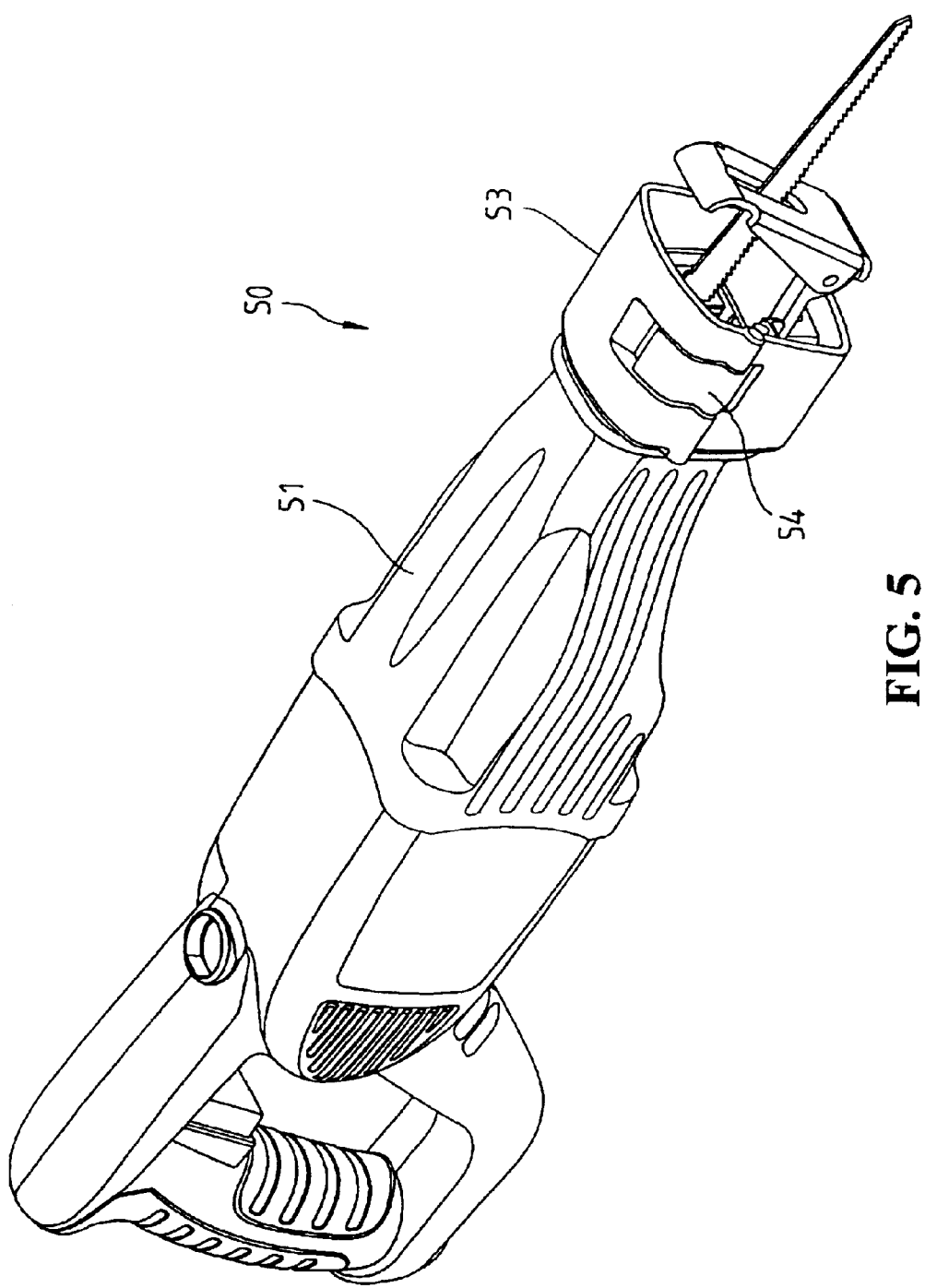
FIG. 5 is a perspective view to show an electric saw with the blade clamping device of the present invention.
Figure 6:
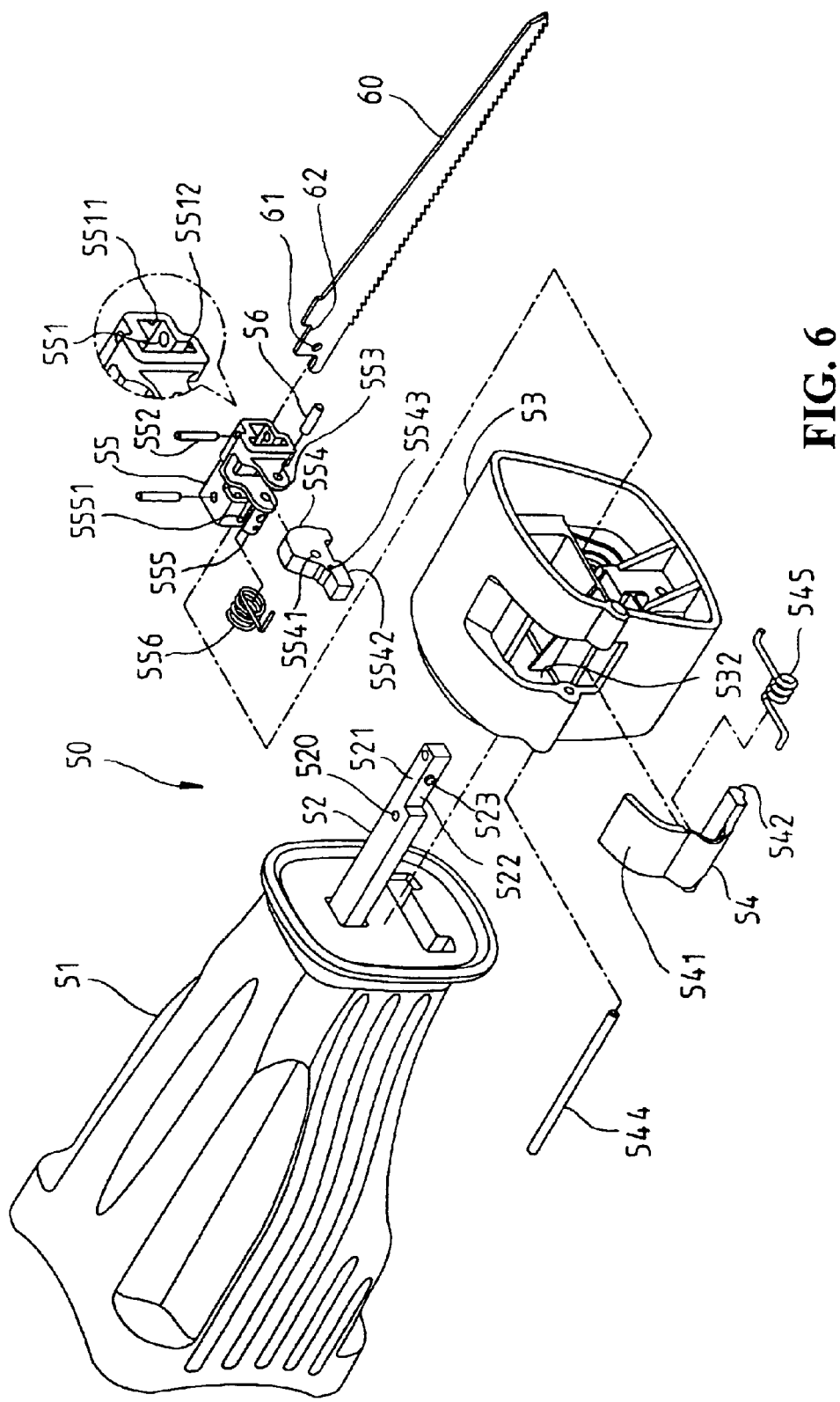
FIG. 6 is an exploded view to show the blade clamping device of the present invention.
Figure 7:
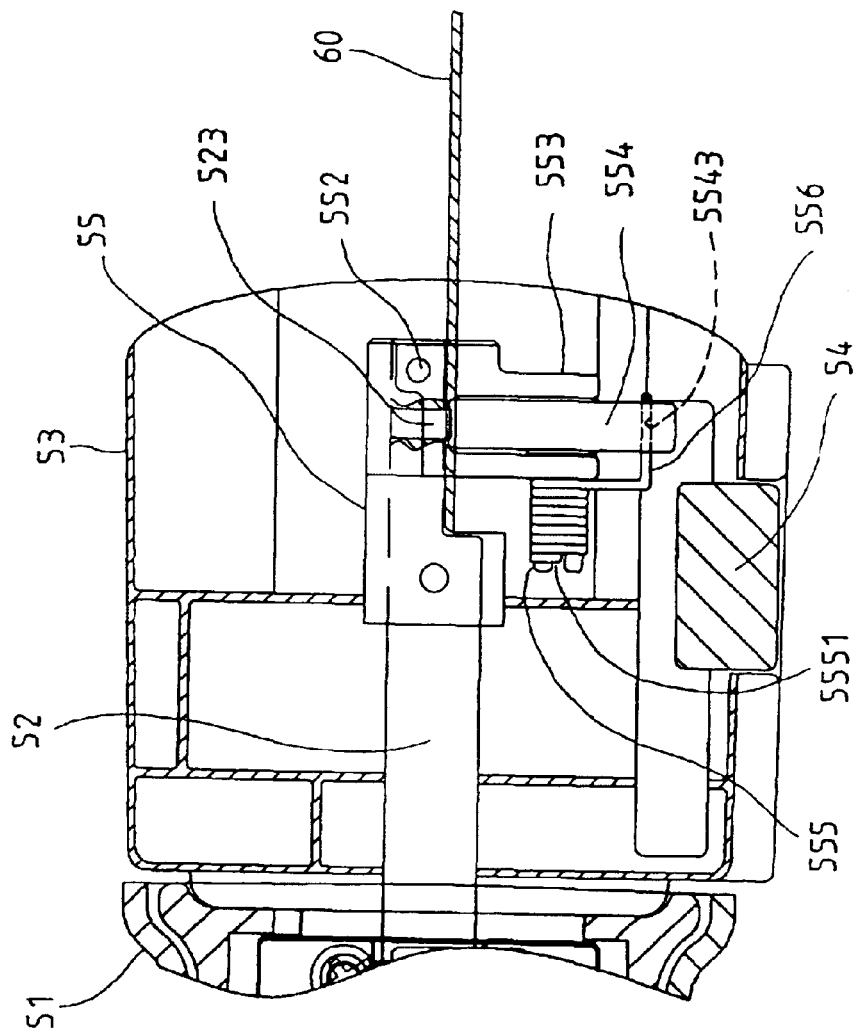
FIG. 7 is a top view to show the torsion spring that maintains the cam member to contact the blade.
Figure 8:
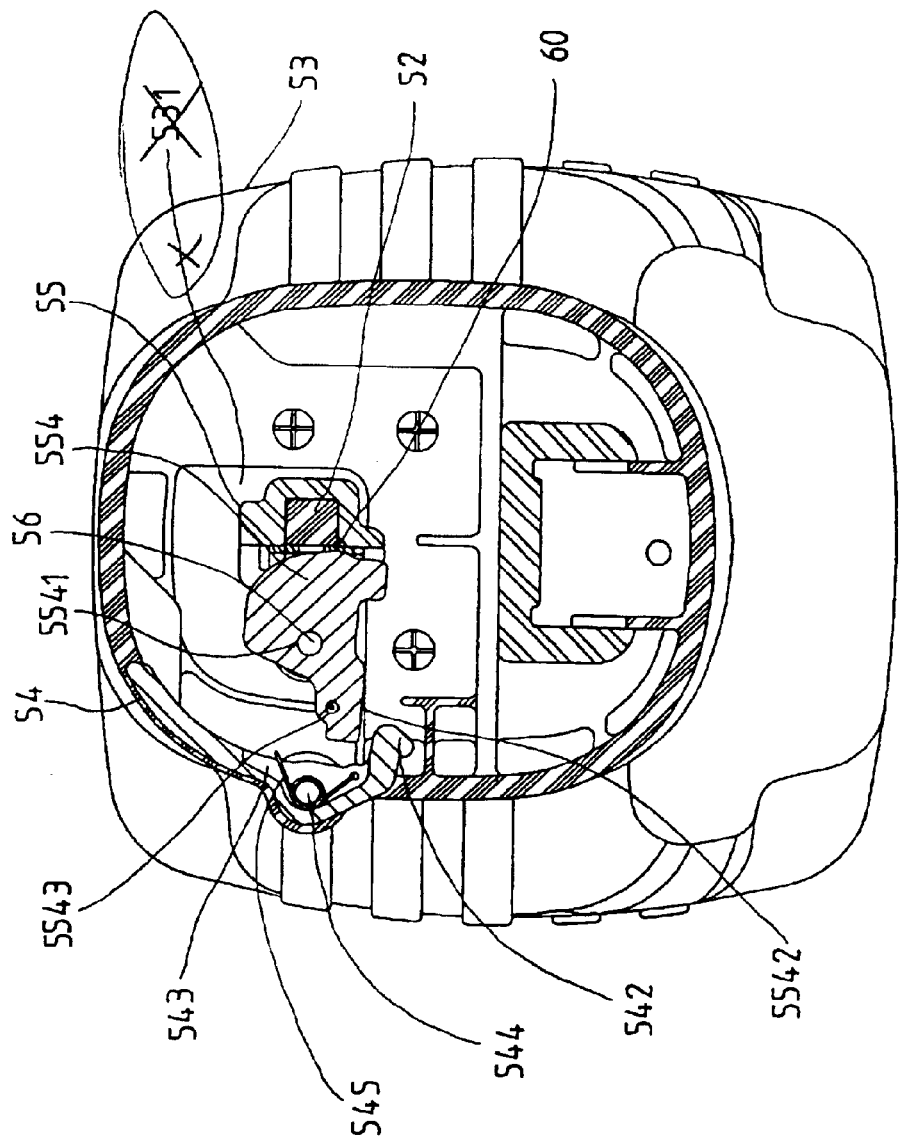
FIG. 8 shows the positions of the cam member and the lever which is not yet pivoted.

Referring to FIGS. 5 to 8, the blade clamping device for an electric saw 50 of the present invention comprises a driving shaft 52 that extends from a distal end of a barrel 51 of the electric saw 50 and an extension 521 extends from a distal end of the driving shaft 52. A boss 523 extends from a side surface 522 of the extension 521 and two positioning holes 520 are defined through the driving shaft 52.

A base member 55 has a passage 551 defined therethrough and the passage 551 includes a first path 5511 and a second path 5512 which communicates with the first path 5511. The driving shaft 52 is securely received in the first path 5511 by extending two pins 552 through the base member 55 and inserted in the two positioning holes 520. A blade 60 is inserted in the second path 5512 and includes a hole 61 through which the boss 523 extends. A stop 62 extends from an edge of the blade 60 and is stopped by an end surface of the base member 55. A first opening is defined through a side of the base member 55 and communicates with the second path 5512 of the passage 551. Two lugs 553 extend from the base member 55 with the first opening located therebetween. A tube 555 extends from one of the two lugs 553 and a slit 5551 is defined in the tube 555.

A cam member 554 is pivotably connected through hole 5541 between the two lugs 553 of the base member 55 by a pin 56 and a first end of the cam member 554 is a cam head which is inserted in the first opening and removably contacts the blade 60. A second end of the cam member 554 is a bar 5542. A first torsion spring 556 is mounted to the tube 555 and one of two legs of the first torsion spring 556 is engaged with the slit 5551 and the other leg is inserted in a hole 5543 in the bar 5542 and presses the bar 5542 of the cam member 554. The first torsion spring 556 maintains the cam head to normally contact the blade 60.

A casing 53 is connected to the distal end of the barrel 51 of the electric saw 50 and has a second opening 532 defined in a side thereof. A lever 54 is pivotably engaged with the second opening 532 by a pin 544 extending through a plate 543 on an inside of the lever 54 and engaged with the opposite walls of the second opening 532. The lever 54 includes a handle 541 and a pushing end 542 which is located beneath the bar 5542 of the cam member 554. A second torsion spring 545 is mounted to the pin 544 and one of two legs of the second torsion spring 545 is hooked at an inside of the second opening 532 and the other leg is inserted in a hole in the plate 543.

Figure 9:
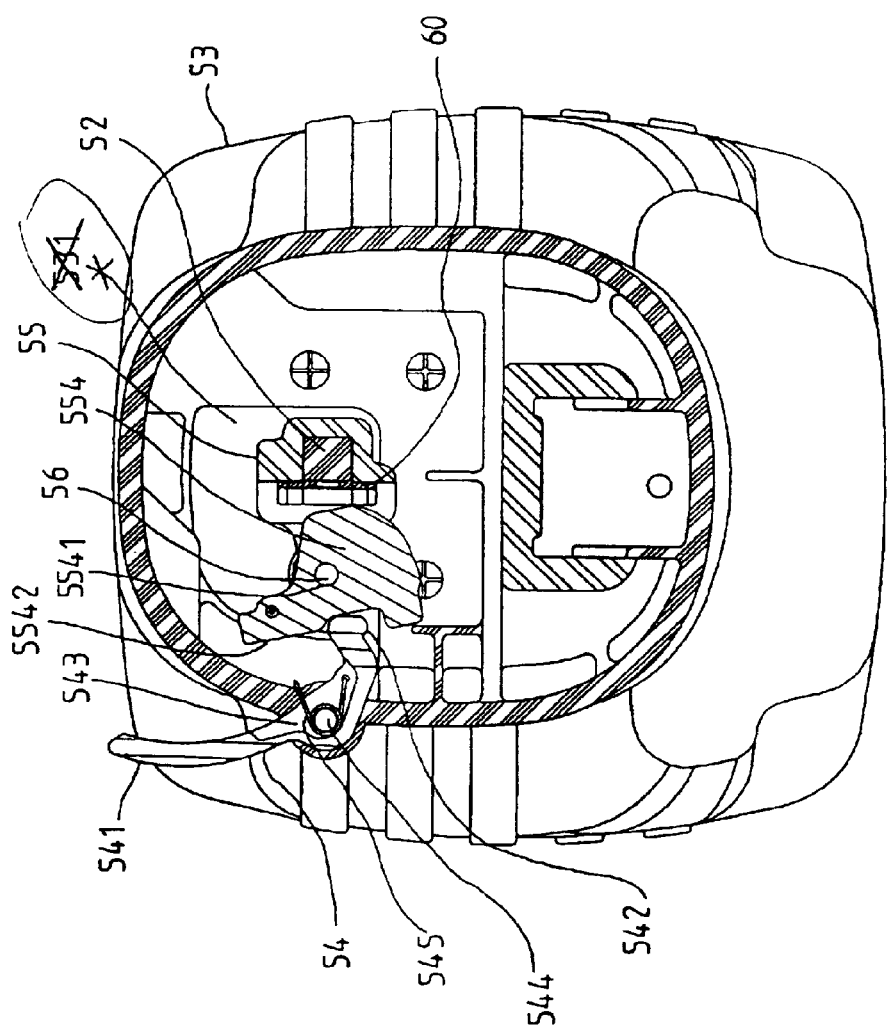
FIG. 9 shows the lever is pivoted to remove the cam head of the cam member to release the blade.

As shown in FIG. 9, when releasing the blade 60, the user simply pulls the handle 541 of the lever 54 to let the pushing end 542 go counter-clockwise to push the bar 5542 of the cam member 554. The cam head of the cam member 554 is then pivoted away from the blade 60 so that the blade 60 can be removed from the second path 5512 of the passage 551 and a new blade can be installed. When releasing the handle 541, the second torsion spring 545 makes the pushing end 542 pivot clockwise and the first torsion spring 556 pivots the cam head of the cam member 554 to position the blade again.

This clamping device improves the shortcomings of the conventional blade clamping devices and allows the user to quickly and conveniently replace new blades. Besides, the force that the clamping member 554 applies to the blade 60 can be controlled in a pre-determined range.

While we have shown and described the embodiment in accordance with the present invention, it should be clear to those skilled in the art that further embodiments may be made without departing from the scope of the present invention.

What is claimed is:

1. A blade clamping device comprising:

a driving shaft having an extension extending from a distal end thereof;

a base member having a passage defined therethrough, the driving shaft securely received in the passage and a blade connected to the driving shaft, a first opening defined through a side of the base member and communicating with the passage;

a cam member pivotably connected to the base member and a first end of the cam member being a cam head which is inserted in the first opening and removably contacting the blade, a second end of the cam member being a bar, a first torsion spring connected to the base member to maintain the cam head to contact the blade;

a casing having a second opening defined in a side thereof and a lever pivotably engaged with the second opening, the lever including a handle and a pushing end, the pushing end of the lever located beneath the bar of the cam member, the cam head of the cam member being pivoted away from the blade by the pushing end by pivoting the lever; and two lugs extend from the base member with the first opening located therebetween, a tube extending from one of the two lugs and a slit defined in the tube, the first torsion spring mounted to the tube and one of two legs of the first torsion spring engaged with the slit and the other leg pressing on the bar of the cam member.

2. The device as claimed in claim 1, wherein the passage includes a first path and a second path which communicates with the first path, the driving shaft is securely received in the first path and the blade is inserted in the second path.

3. The device as claimed in claim 2 further comprising a boss extending from a side surface of the extension of the blade has a hole through which the boss extends.

4. The device as claimed in claim 1 further comprising a stop extending from an edge of the blade and being stopped by an end surface of the base member.

5. The device as claimed in claim 1, wherein the driving shaft has two positioning holes and two pins extend through the base member and are inserted in the two positioning holes.

* * * * *

UNITED STATES PATENT AND TRADEMARK OFFICE
Certificate

Patent No. 6,848,186 B1

Patented: February 1, 2005

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Eric Lo, Taichung Hsien (TW); and George Ku, Taichung Hsien (TW).

Signed and Sealed this Twelfth Day of January 2010.

BOYER D. ASHLEY
*Supervisory Patent Examiner*
Art Unit 3724